April 8, 1969     W. R. LATADY ET AL     3,437,748
MOTION PICTURE CAMERA SYSTEM
Filed Nov. 24, 1967     Sheet _1_ of 4
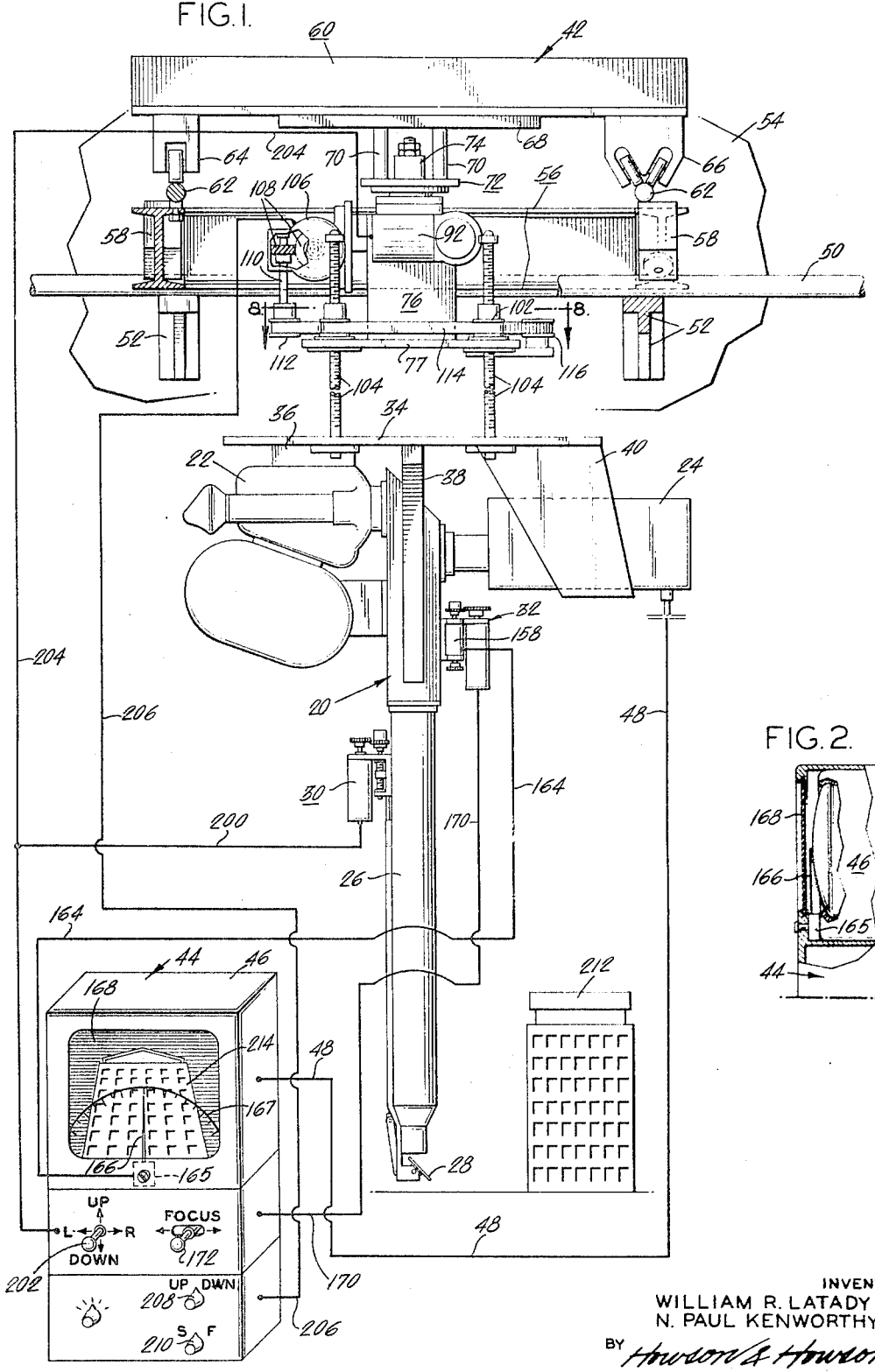
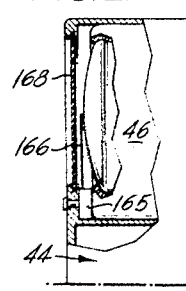
INVENTORS:
WILLIAM R. LATADY
N. PAUL KENWORTHY, JR.
BY Howson & Howson
ATTYS.

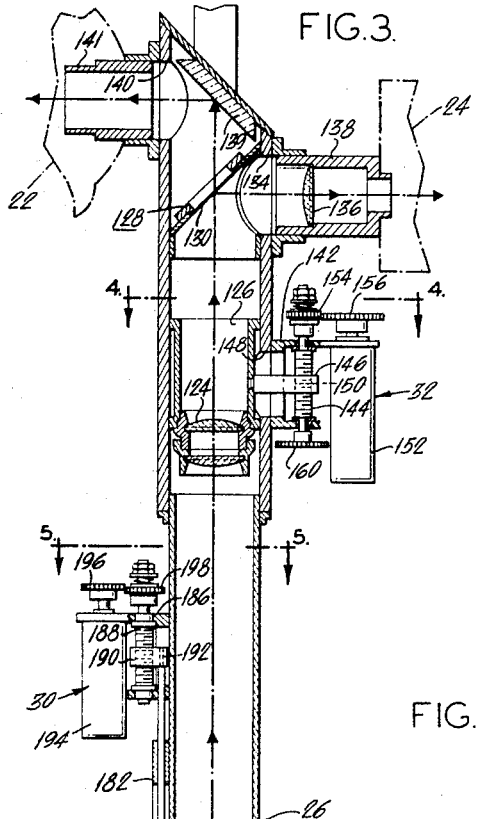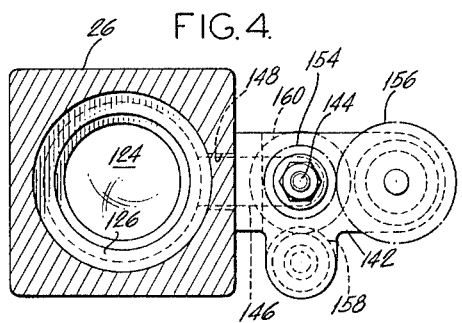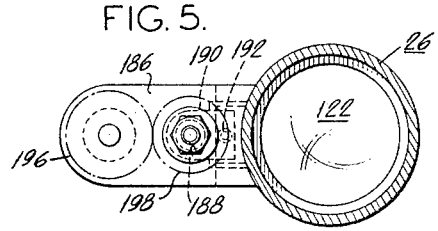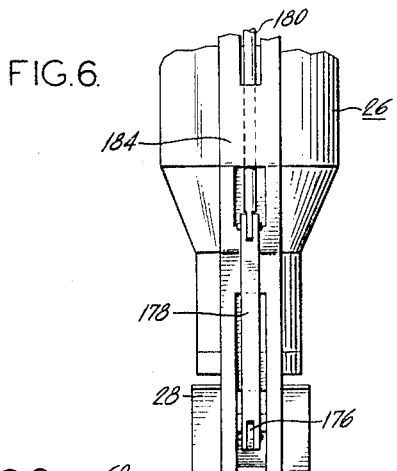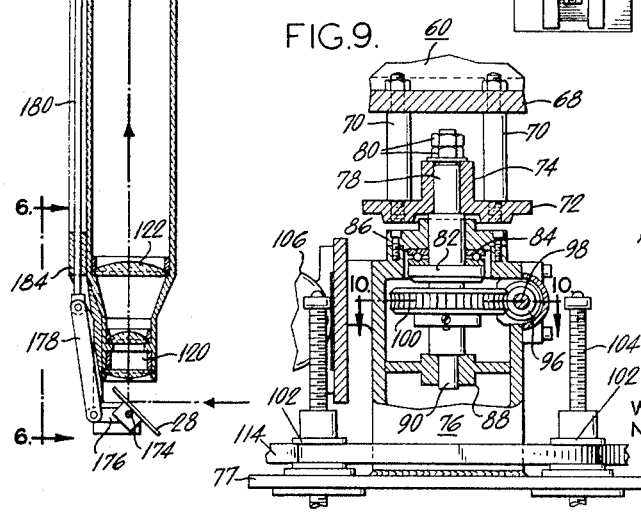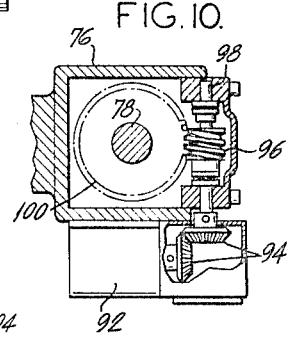

April 8, 1969  W. R. LATADY ET AL  3,437,748
MOTION PICTURE CAMERA SYSTEM
Filed Nov. 24, 1967
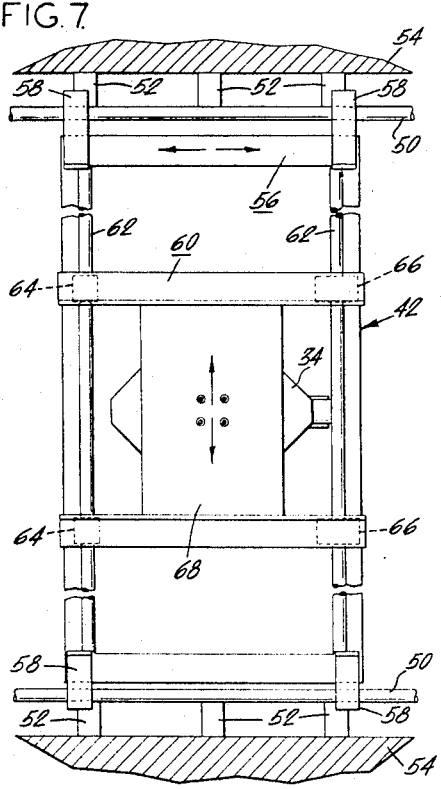
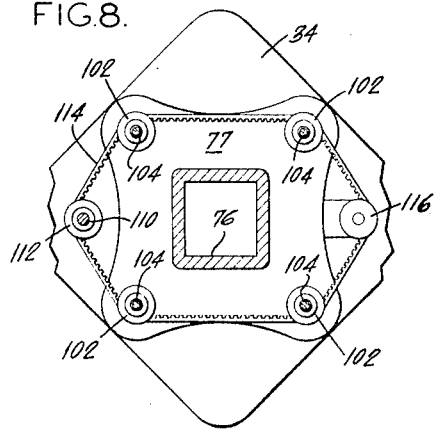
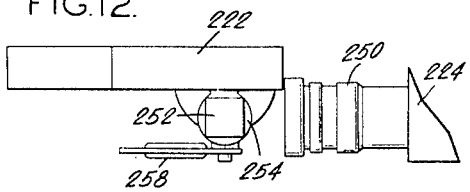
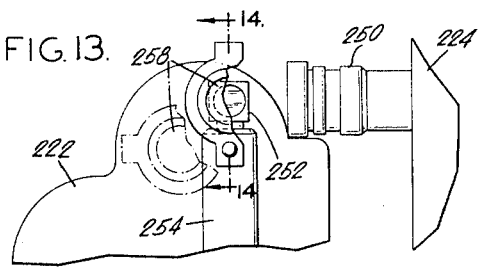
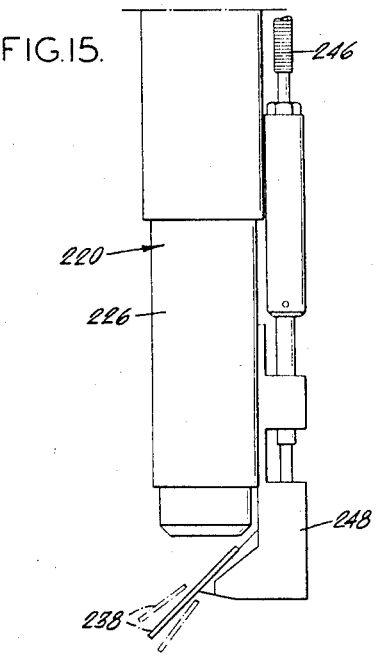
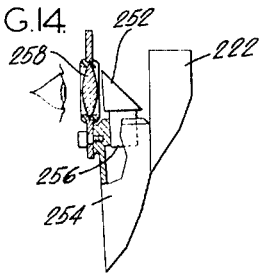
INVENTORS:
WILLIAM R. LATADY
N. PAUL KENWORTHY, JR.
BY Howson & Howson
ATTYS.

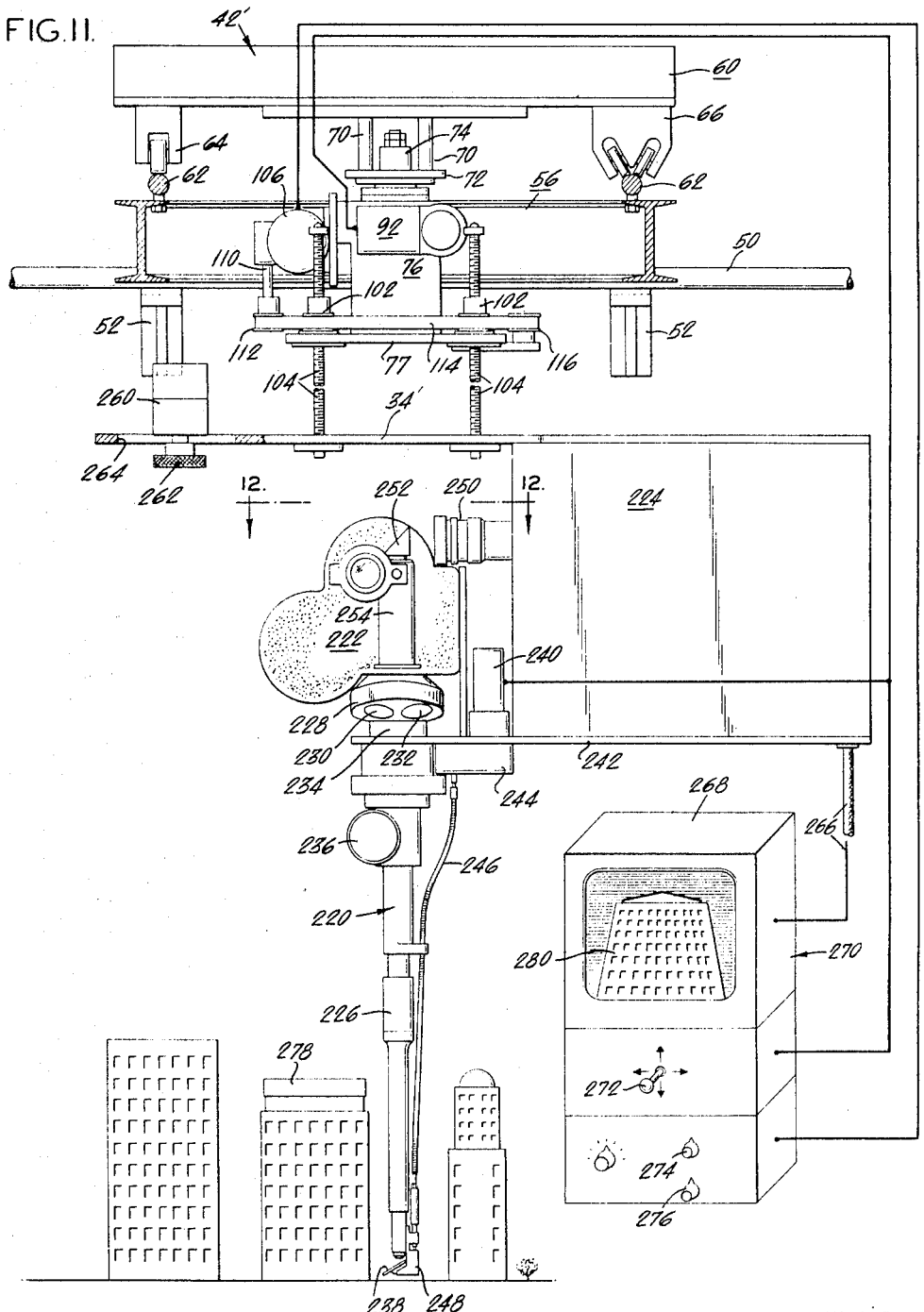

United States Patent Office 3,437,748
Patented Apr. 8, 1969

3,437,748
MOTION PICTURE CAMERA SYSTEM
William R. Latady, 345 E. Gowen Ave., Philadelphia, Pa.
19119, and Norman Paul Kenworthy, Jr., 11915 Goshen
Ave., Los Angeles, Calif. 90049
Continuation-in-part of application Ser. No. 454,287,
May 10, 1965. This application Nov. 24, 1967, Ser.
No. 685,438
Int. Cl. H04n 7/00
U.S. Cl. 178—6.8
12 Claims

ABSTRACT OF THE DISCLOSURE

A motion picture camera system including a motion picture camera which is mounted on a support means permitting selective X, Y and Z movement as well as rotation. An elongated lens tube extending from the motion picture camera terminates in an angularly adjustable mirror which directs an image into the lens tube and camera. A television camera is mounted with the motion picture camera to view the image recorded by the motion picture camera either by means of a beam splitting arrangement or by directing the television camera into the view finder or a reflex motion picture camera. The image photographed may thus be simultaneously viewed remotely on a television receiver and the movement of the camera gauged and remotely controlled according to the image presented on the television screen.

---

This application is a continuation-in-part of our co-pending application Ser. No. 454,287 filed May 10, 1965 now abandoned.

The present invention relates generally to a motion picture camera system for obtaining close-in camera viewing angles and controlled camera movement in areas normally inaccessible to conventional photographic equipment. More particularly, the invention relates to such a system which includes a television camera cooperatively arranged with the motion picture camera to transmit an image to a remote camera control station at which the camera field of view may be continuously monitored.

The present camera system is particularly adapted for the photographing of architectural models to provide motion pictures simulating full size structures as they would appear from ground level or from the air. Other uses include the photographing of medical operations, the photographing of model airport facilities to simulate aircraft landings and take-offs, and a variety of similar uses wherein accurate control of a remote movable motion picture camera is desired. The system is uniquely suited when equipped with a wide angle lens for close-up photography within a confined space, for example in photographing the interior of a teacup or coffee jar to obtain dramatic views of the contained products for filmed television commercials.

The present motion picture camera system in brief comprises a motion picture camera mounted on a supporting means which permits selective linear and rotary camera movement. The motion picture camera is provided with an elongated lens tube enclosing an optical relay system, the lens tube having a mirror angularly mounted on the outer end thereof to reflect an image into the optical relay system within the tube. Means are provided for remotely varying the angle of the mirror with respect to the tube. A television camera is cooperatively mounted with the motion picture camera on the supporting means to view the image recorded by the motion picture camera, either by use of a beam splitting device or by directing the television camera into the view finder of a reflex type motion picture camera. The television receiver is remotely located adjacent the controls for the camera support means and lens tube mirror.

The combined use of a television camera and motion picture camera in the present system permits extremely accurate camera control which could not be obtained by the conventional use of the camera view finder. Not only would viewing directly through the view finder be awkward during movement of the camera, but there would in addition be a continual risk of effecting inadvertent camera movement. By observation in the present system of the field of view of the motion picture camera on a remote closed circuit monitoring screen located adjacent the camera controls, movement of the motion picture camera may be properly coordinated by reference to the televised image.

It is accordingly a primary object of the present invention to provide a remotely controllable motion picture camera system for obtaining camera view angles which are not obtainable with conventional equipment.

A further object of the invention is to provide a motion picture camera system as described which incorporates an elongated lens tube having an adjustable angled mirror at the outer end thereof and which is particularly adapted for close-in wide angle photography.

Another object of the invention is to provide a motion picture camera system as described which is particularly adapted for the photographing of architectural models from low camera angles to simulate the full size structures as they would appear from ground level.

A still further object of the invention is to provide a motion picture camera system as described which utilizes a television camera in conjunction with a motion picture camera to provide a remote monitoring of the image being recorded by the motion picture camera.

Additional objects and advantages of the invention will be more readily apparent from the following detailed description of embodiments thereof when taken together with the accompanying drawings in which:

FIG. 1 is a side elevational view of a motion picture camera system embodying the present invention, shown employed in the photographing of a model building;

FIG. 2 is a partial sectional side elevational view of the control console of the system of FIG. 1 showing the manner in which the camera focus indicator is superimposed over the television receiver screen;

FIG. 3 is a vertical sectional view taken through the lens tube of the system shown in FIG. 1 and showing the details of the optical relay system;

FIG. 4 is an enlarged sectional view taken along line 4—4 of FIG. 3 showing details of the camera focusing arrangement;

FIG. 5 is an enlarged sectional view taken along line 5—5 of FIG. 3 showing details of the mirror angle control means;

FIG. 6 is an enlarged elevational view taken along line 6—6 of FIG. 3 showing mounting details of the lens tube mirror;

FIG. 7 is a plan view of the system shown in FIG. 1;

FIG. 8 is a plan view taken along line 8—8 of FIG. 1 showing the details of the mechanism for raising and lowering the camera support plate;

FIG. 9 is a sectional side elevational view showing the internal details of the drive mechanism for rotating the camera system;

FIG. 10 is a sectional view taken along line 10—10 of FIG. 9;

FIG. 11 shows a modified embodiment of the present invention utilizing a through-the-lens reflex motion picture camera with the television camera viewing through the view finder of the motion picture camera;

FIG. 12 is a plan view taken along line 12—12 of FIG. 11 showing the prism used on the motion picture camera view finder for transmitting the field of view to the television camera;

FIG. 13 is a side view of the apparatus shown in FIG. 12 showing the manner in which the prism may be rotated to permit direct viewing with the aid of a viewing lens;

FIG. 14 is a view taken along line 14—14 of FIG. 13 showing details of the prism and viewing lens; and FIG. 15 is an enlarged view of the lower end of the lens tube of the FIG. 11 embodiment showing the manner in which the mirror may be selectively inclined to provide different viewing angles.

Referring to the drawings and particularly FIG. 1 thereof, a motion picture camera system generally designated 20 is shown including a motion picture camera 22 and a television camera 24 cooperatively mounted with respect to an elongated lens tube 26 so that each camera will view the same image transmitted through the lens tube 26 by means of an optical relay system contained therein. The lens tube 26 includes at its lower end an angularly oriented first-surfaced mirror 28 which is angularly adjustable by means of the angle control means 30 to reflect a selected image into the lens tube. A focusing means 32 is provided on the elongated lens tube for focusing the optical system in a manner described in detail below.

The motion picture camera 22, lens tube 26 and television camera 24 are respectively supported beneath a camera mounting plate 34 by brackets 36, 38 and 40. The camera mounting plate 34 is part of a camera system support means generally designated 42 by means of which a linear and rotational movement of the cameras may be effected.

A remotely located console 44 includes a television receiver 46 for viewing the image picked up by the television camera 24, the receiver being connected thereto by the cable 48. Other controls on the console 44 will be described hereinbelow in connection with the detailed description of the embodiment.

The support means 42 as shown most readily in FIG. 7 extends between spaced parallel rails 50 horizontally mounted by supports 52 on the spaced parallel walls 54. A first carriage 56 is adapted for longitudinal movement along the rails 50 upon schematically shown roller assemblies 58. Similarly, a second carriage 60 is transversely slidable along rails 62 on the first carriage 56 upon roller assemblies 64 and 66 shown most clearly in FIG. 1. The rails and the roller assemblies are preferably machined to close tolerances to provide a smooth "floating" movement of the supported cameras.

Suspended beneath a cross plate 68 of the second carriage 60 by means of posts 70 and support element 72 having a centrally bored boss 74 thereon, is a gear housing 76 having a horizontal plate 77 attached to the lower end thereof. The gear housing 76 is rotatably supported beneath the support element 72 on the shaft 78 which is fixed to the support element by the lock nuts 80. A collar 82 fixed to the shaft 78 is provided with a bearing assembly 84 on which upper end 86 of the gear housing is rotatably supported. Proper alignment of the gear housing with respect to the shaft 78 is maintained by means of bearing rib 88 of the gear housing contacting the lower end 90 of the shaft.

As will be presently described in detail, the camera support plate 34 is supported beneath the horizontal plate 77 and hence the rotation of the gear housing 76 causes a rotation of the camera support plate and the cameras mounted thereunder. Rotation of the gear housing 76 is effected by means of a motor 92 which as shown in FIG. 10 through miter gears 94 drives the worm 96 on the shaft 98 journaled in the gear housing 76. The worm 96 intermeshes with a worm wheel 100 fixed to the shaft 78 so that rotation of the worm 96 will rotate the gear housing 76 and hence the suspended camera system around a vertical axis.

As shown in FIGS. 1 and 8, a plurality of spaced gears 102 are rotatably attached to the horizontal plate 77 at the lower end of the gear housing 76. The gears 102 are internally threaded to receive the vertical threaded support rods 104 which are attached at their lower ends to the horizontal camera support plate 34. The camera support plate 34 may be raised or lowered by means of a motor 106 on the gear housing 76 which by means of gears 108 drives the shaft 110 and the drive sprocket 112 on the lower end thereof. A timing belt 114 engaging each of the gears 102 and the idler 116 passes around the drive sprocket 112 to provide a uniform rotation of the gears 102 upon operation of the motor 106. Since the rods 104 will thus be raised or lowered at a uniform rate by the rotation of gears 102, this arrangement insures a continuously level disposition of the camera support plate 34 and thus permits a controlled selective vertical movement of the cameras supported therebeneath.

The details of the elongated lens tube 26 and the optical system contained therein are shown in FIG. 3. Mounted in the lower end of the tube 26 is an objective lens assembly 120 through which the image from the mirror 28 is passed upwardly through a field lens 122 and thence through a relay lens assembly 124 which is mounted in an axially slidable lens support element 126. Mounted above the relay lens assembly at a 45° angle to the axis of the lens tube is a beam splitting device 128 comprising a pellicle 130 which reflects about 8% of the light passing through the relay lens assembly. The image reflected by the pellicle passes through port 134 in the lens tube, through lens 136 in adapter tube 138 connecting the television camera to the lens tube, and thence directly onto the light-receiving surface of the television camera. The image passing through the pellicle strikes a first-surfaced mirror 139 inclined at 45° to the lens tube axis at the upper end thereof which reflects the remaining image light through port 140 in the lens tube and through adapter tube 141 into the motion picture camera 22, the image passing directly onto the camera film plane. By this arrangement, the same image is simultaneously picked up by both the television camera and motion picture cameras.

The focusing of the relay lens assembly 124 is remotely accomplished by the focusing means 32 which includes a bracket 142 extending from the lens tube 26 on which is journaled a vertical helically threaded shaft 144. A transverse arm 146 attached to the slidable lens support element 126 extends through a slot 148 in the lens tube and includes a threaded bore 150 through which the shaft 144 passes in threaded engagement. The shaft 144 is selectively driven in rotation by the D.C. motor 152 mounted on the bracket 142 which is coupled thereto by means of spur gears 154 and 156 at the upper ends thereof.

A potentiometer 158 on bracket 142 driven by the gear 160 on the lower end of the shaft 144 provides an indication of the lens focus position. The potentiometer, which may be of the type sold under the trade name "Helipot" by the Helipot Corp., South Pasadena, Calif., is connected as schematically shown in FIG. 1 by the line 164 to a voltmeter 165 mounted below and in front of the screen of the television receiver 46. The elongated indicator needle 166 of the voltmeter extends across the screen of the television receiver and is read on a scale 167 printed on an outer glass window 168 provided in front of the receiver screen for that purpose, the indicator needle extending upwardly between the window and screen as shown in FIG. 2. The motor 32 of the focusing means is connected to the console as indicated schematically in FIG. 1 by the cable 170 to permit a remote focusing of the relay lens assembly 124 by actuation of the focus control lever 172 of the console 44.

The mirror 28 is pivotally mounted at 174 about an axis perpendicular to the axis of the lens tube 26. The angular setting of the mirror 28 may be remotely adjusted by the mirror control means 30. Arm 176 attached to the mirror is pivotally connected to a link 178 which is in turn pivotally attached to a mirror control rod 180 which is slidably carried in spaced upper and lower guides 182 and 184 on the lens tube 26. A bracket 186 mounted to the lens tube 26 above the guide 182 rotatably supports a vertical threaded shaft 188. A threaded follower 190 on the shaft 188 is connected to the upper end 192 of the mirror control rod 180 whereby rotation of the shaft 188 will provide vertical movement of the mirror control rod. The shaft 188 is rotated by the direct current motor 194 mounted on bracket 186 and which is coupled thereto by gears 196 and 198. As indicated schematically in FIG. 1, cable 200 connecting the motor 194 and the console 44 permits a remote control of the mirror angle by actuation of the control 202.

A cable 204 connecting the console with the motor 92 permits remote control of the rotation of the camera system and as schematically illustrated both the motors 92 and 194 are controlled by the single "joy stick" type control 202 so that rotation of the camera and adjustment of the mirror angle may be effected by manipulation of a single lever. The motor 106 is similarly connected by line 206 to the console 44 and the camera system may be raised or lowered remotely by means of the console switch 208. A further control 210 provides a variation of the speed rate at which the unit is moved upwardly or downwardly. Although longitudinal and transverse linear movement of the camera system could be remotely controlled by the addition of appropriate drive means and controls for the carriages 56 and 60, in the illustrated embodiments such movements are manually effected.

The operation of the present motion picture system involves a series of simultaneous or successive movements of the camera and mirror 28 as coordinated by reference to the television receiver. One or more operators at the control console 44 and one or more operators manually moving the carriages 56 and 60 are required to carry out coordinated movements of the unit. In FIG. 1 the system is shown employed in the photographing of a model building 212. Before the filming starts, the television camera and receiver are energized so that an image 214 is presented on the television receiver screen to initially orient the lens tube and mirror position. The initial starting position is adjusted as required by means of the controls 202 and 208 and by manual movement of the carriages 56 and 60. The correct starting focus is established by means of the focus control 172. In the camera position shown in FIG. 1, the lens tube 26 and mirror 28 are positioned close to the surface on which the model building 212 is placed to simulate a view of the building from "ground level" as shown by the realistic image 214 on the closed circuit television monitor.

When the desired initial setting of the apparatus has been achieved, the motion picture camera 22 is started and the desired camera movements are effected by means of the motor controls on the console and by manual movement of the carriages 56 and 60 while viewing the image recorded on film by means of the television monitor. The operator controlling the carriages should call out the desired focus distances, and the operator at the console can quickly make the proper focus change without removing his eyes from the image on the television screen by virtue of the superimposed focus indicator needle 166 and scale 167 over the televised image.

It is desirable in most instances to practice a filming run without the operatoin of the motion picture camera, the television camera and receiver providing an accurate indication of the scene to be placed on film. By means of such rehearsals, the waste of expensive movie film can be avoided to a large degree.

In situations in which the television receiver and motor controls cannot be located near the camera system, means should be provided to permit control of all of the necessary camera movements from the control console.

Although the motion picture camera 22 illustrated in the drawings is a 35 millimeter Arriflex manufactured by Arnold & Richter GmBH of Munich, other commercially available cameras may be used in the system. Similarly, various types of lens systems could be employed in the lens tube 26. For photographing close-in views such as the building scene illustrated it is generally preferable to use a wide angle objective lens to maximize the field of view and the depth of focus.

A modified embodiment of the invention is shown in FIGS. 11–15 wherein a camera system generally designated 220 including a reflex type movie camera 222, television camera 224 and elongated lens tube 226 are set forth. The support means 42' for this modified system is exactly the same as that described in detail with respect to the preferred embodiment with the exception of the camera mounting plate 34'. The corresponding parts of the support means are thus given the same identifying numbers.

In the modified embodiment, the motion picture camera 222 is a through-the-lens reflex camera and includes a turret head 228 having its two unused lens mounting sockets visible at 230 and 232. The reflex camera 222 is mounted directly above the lens tube 226 with the operating turret socket thereof connected to the lens tube by adapter 234. As in the preferred embodiment, no lens is employed in the camera, the optical relay system within the lens tube 226 providing the proper image on the camera film plane.

The optical relay system within the lens tube 226 is essentially the same as that of the preferred embodiment without the image splitting device 128 and mirror 139. An objective lens and field lens at the lower end of tube 226 direct an image upwardly to a relay lens which may be manually focused by means of control knob 236 connected to the lens mounting by means of a rack and pinion. A first-surfaced mirror 238 pivotally mounted at the lower end of the lens tube is rotatable about an axis perpendicular to the tube by means of a D.C. motor 240 mounted on bracket 242 which connects the television camera and movie camera in a rigid mounting. The motor 240 actuates the mirror 238 by means of a drive box 244 and flexible shaft 246 which connects with a worm and gear drive (not shown) within mirror control housing 248 attached to the lower end of the lens tube 226.

The television camera 224 is mounted beneath the camera mounting plate 34' and as indicated above supports the motion picture camera 222 and the elongated lens tube 226 by means of the bracket 242. The television and motion picture cameras are mounted in such a manner that the lens 250 of the television camera is aligned with a prism 252 mounted on the motion picture camera view finder 254 whereby the image transmitted to the film plane of the motion picture camera by the optical relay system within the lens tube 226 is viewed by the television camera. While various makes of through-the-lens type reflex motion picture cameras could be employed in this system, the camera illustrated is an Arriflex 16 millimeter reflex camera. In this type of camera a mirror rotating with the shutter intermittently directs the image viewed by the camera film plane to the view finder.

The details of the prism arrangement on the motion picture camera view finder 254 are shown in FIGS. 12–14. The prism 252 includes a cylindrical neck portion 256 which is rotatably seated within the end of the view finder. The prism may thus be rotated 90° to permit direct viewing of the camera field of view for accurate focusing of the optical relay system, for which purpose a pivotally mounted viewing lens 258 is provided. Following the focusing adjustment the prism is of course turned back to its normal position facing the television camera lens 250.

Because of the unbalanced arrangement of the television and movie cameras in the modified embodiment of FIG. 11, a counterweight 260 having an adjustment knob 262 is mounted on the camera mounting plate 34' and is slidable in a slot 264 therein to permit a balancing of the suspended camera system.

The television camera is connected by cable 266 to a television receiver 268 located in a control console 270 which may be remotely located from the camera system. A single "joy stick" control 272 is provided in the console 270 to control the mirror angle and rotation of the camera unit in the same manner described above with respect to the preferred embodiment. Similarly, a control knob 274 permits remote control of the raising and lowering of the system, the speed of which may be changed by means of the knob 276, again in the same manner as that previously described. Operation of the modified embodiment is essentially the same as that of the preferred embodiment except that the focusing is accomplished manually by means of the focusing control knob 236.

The modified embodiment is illustrated in FIG. 11 as focused on a model building 278 from a low "ground level" and the image 280 of the building may be seen on the television receiver in the console 270. This embodiment could of course be provided with a remote focusing arrangement such as that shown with the preferred embodiment and could also be provided with an automatic drive and control means for moving the first and second carriages of the support means 42'.

Although the elongated lens tube in each of the illustrated embodiments of the invention is shown in a vertical downwardly directed disposition, for certain special applications it is conceivable that the lens tube may be disposed horizontally or at any desired angle. Modifications would of course be required in the support and control means for such installations.

Manifestly, changes in details of construction can be effected by those skilled in the art without departing from the spirit and the scope of the invention as defined in and limited solely by the appended claims.

We claim:
1. A camera system comprising a motion picture camera, a television camera, said motion picture and television cameras being mounted on a common support means, said support means being adapted for selective controlled linear and rotary movement, an elongated small diameter lens tube containing an optical relay system, a remotely adjustable mirror on one end of said lens tube adapted to reflect an image into the optical relay system within said tube, means connecting the opposite end of said lens tube with said motion picture camera and television camera whereby the image transmitted by said optical relay system to the camera film plane is also transmitted to the television camera, a television receiver remote from said support means adapted to receive the image transmitted by said television camera, and control means adjacent said remote television receiver for controlling the movement of said support means and said adjustable mirror, said elongated small diameter lens tube containing the optical relay system permitting the movement of the image reflecting mirror into confined areas inaccessible with conventional equipment.

2. A camera system as claimed in claim 1 wherein said means connecting the opposite end of said lens tube with said motion picture camera and television camera includes a beam splitting device by means of which a portion of the image light is diverted to the television camera with the remainder passing to the motion picture camera.

3. A camera system as claimed in claim 2 wherein said beam splitting device comprises a pellicle mounted within said lens tube for diverting an image to said television camera.

4. A camera system as clamed in claim 1 wherein said elongated lens tube is mounted in a vertical downwardly directed disposition and wherein said support means includes a first carriage adapted for longitudinal horizontal movement, a second carriage adapted for transverse horizontal movement on said first carriage, and means on said second carriage supporting said motion picture and television cameras adapted for vertical movement and for rotary movement about a vertical axis.

5. The system as claimed in claim 1 wherein said mirror is rotatably adjustable about an axis perpendicular to the axis of said lens tube.

6. A camera system as claimed in claim 1 including means for remotely focusing said optical relay system.

7. A system as claimed in claim 6 including indicator means for remotely indicating the focus setting of said optical relay system, said indicator means including an indicator superimposed over the screen of said television receiver.

8. A camera system comprising a reflex type motion picture camera, an elongated small diameter lens tube connected with said camera, an optical relay system within said lens tube, a remotely adjustable mirror on the outer end of said lens tube adapted to reflect an image into the optical relay system within said tube, the image being transmitted by said optical relay system to the camera film plane, means supporting said camera adapted for selective controlled linear and rotary movement, a television camera on said supporting means cooperatively arranged with the view finder of said motion picture camera to pick up an image corresponding to the image recorded by said motion picture camera, a television receiver remote from said supporting means adapted to receive the image transmitted by said television camera, and control means adjacent said remote television receiver for controlling the movement of said supporting means and said adjustable mirror, said elongated small diameter lens tube containing the optical relay system permitting the movement of the image reflecting mirror into confined areas inaccessible with conventional equipment.

9. The system as claimed in claim 8 wherein said elongated lens tube is mounted in a vertical downwardly directed disposition and wherein said means supporting said cameras includes a first carriage adapted for longitudinal horizontal movement, a second carriage adapted for transverse horizontal movement on said first carriage, and means on said second carriage supporting said motion picture and television cameras adapted for vertical movement and for rotary movement about a vertical axis.

10. The system as claimed in claim 8 wherein said mirror is rotatably adjustable about an axis perpendicular to the axis of said lens tube.

11. The system claimed in claim 8 including a prism associated with the view finder of said motion picture camera for transmitting the image from said view finder to said television camera, said prism being rotatably mounted to permit direct viewing through said view finder.

12. The system claimed in claim 11 including a viewing lens mounted on said view finder adjacent said prism for direct viewing through said prism and view finder.

References Cited

UNITED STATES PATENTS

| 2,566,509 | 9/1951 | Albright | 178—6 |
| 2,698,356 | 12/1954 | Roos | 352—131 |
| 2,905,758 | 9/1959 | Walker | 178—6 |
| 2,963,937 | 12/1960 | Raitiere | 350—173 |
| 2,979,832 | 4/1961 | Klemperer | 178—6 |
| 3,128,339 | 4/1964 | Wupper | 178—6.8 |

ROBERT L. GRIFFIN, *Primary Examiner.*

JOSEPH A. ORSINO, JR., *Assistant Examiner.*

U.S. Cl. X.R.

178—6; 350—173; 352—131